March 2, 1943. R. HAUGUEL 2,313,000
DEVICE FOR THE CONTROL OF THE FUEL SUPPLY OF ENGINES
Filed March 25, 1939 2 Sheets-Sheet 1

Inventor.
Robert Hauguel
J. Friedman
Attorney.

Patented Mar. 2, 1943

2,313,000

UNITED STATES PATENT OFFICE 2,313,000

DEVICE FOR THE CONTROL OF THE FUEL SUPPLY OF ENGINES

Robert Hauguel, Le Havre, France; vested in the Alien Property Custodian

Application March 25, 1939, Serial No. 264,265
In France June 13, 1938

4 Claims. (Cl. 192—.01)

The present invention relates to a device for the remote control of the fuel supply of engines and its object is to enable a certain speed of operation of the engine to be predetermined from a distance while allowing the driver the option of modifying said speed at will by means of the usual members such as: brake, clutch and accelerator pedals.

The remote control according to the invention is designed so as to offer, in particular, the following advantages:

The possibility, in the case in which a lower speed of operation than the maximum speed is predetermined, of increasing the inlet to said maximum speed by completely depressing the usual accelerator pedal.

The possibility of disengaging the clutch and consequently of changing gear without racing the engine, with automatic return to the predetermined speed when the clutch is engaged, without involving the use of any other control.

The possibility of braking by bringing back the inlet automatically towards a minimum without touching the speed predetermining member with automatic return to the predetermined speed when the brake is released, without involving the use of any other control.

The possibility of gradually reducing the inlet corresponding to the predetermined speed by depressing one or both of the brake and clutch pedals.

The possibility of giving the maximum inlet at all times and in spite of the effects of the brake and clutch pedals, by operating the predetermining control or the usual accelerator pedal.

All these possibilities are provided for the purpose of procuring greater ease of driving by decreasing fatigue, in particular in long journeys, by considerably reducing the usual operations, while allowing the same facility for the operations when starting or when taking inclines.

In the accompanying drawings which are given solely by way of example:

Figure 1:
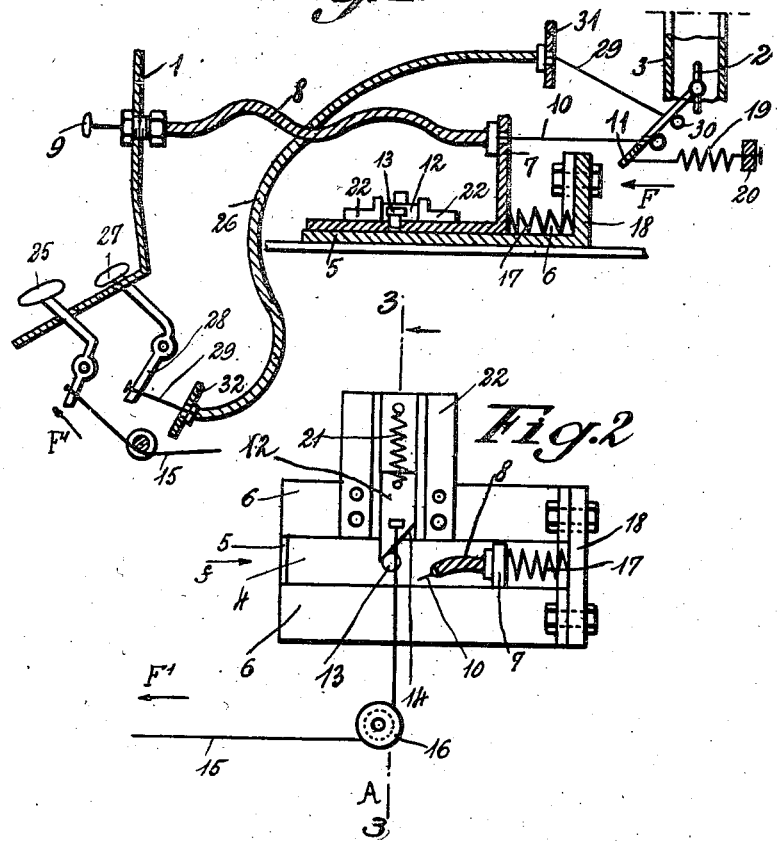
Fig. 1 shows a vertical section of a first embodiment of the device.
Figure 2:
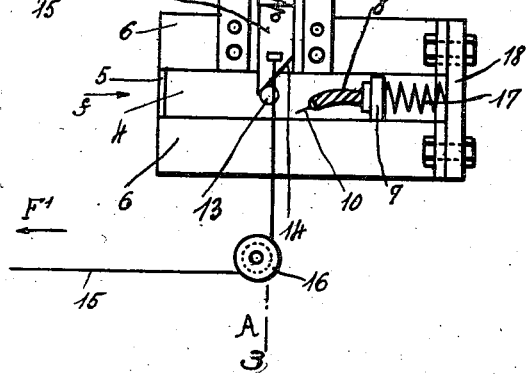
Fig. 2 is a plan view corresponding to that of Fig. 1 and showing the relay of the main control.
Figure 3:
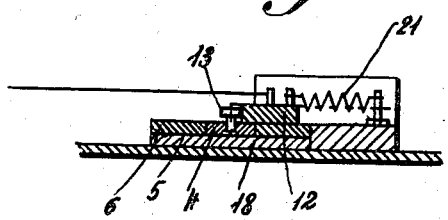
Fig. 3 is a section along 3—3 of Fig. 2.
Figure 4:
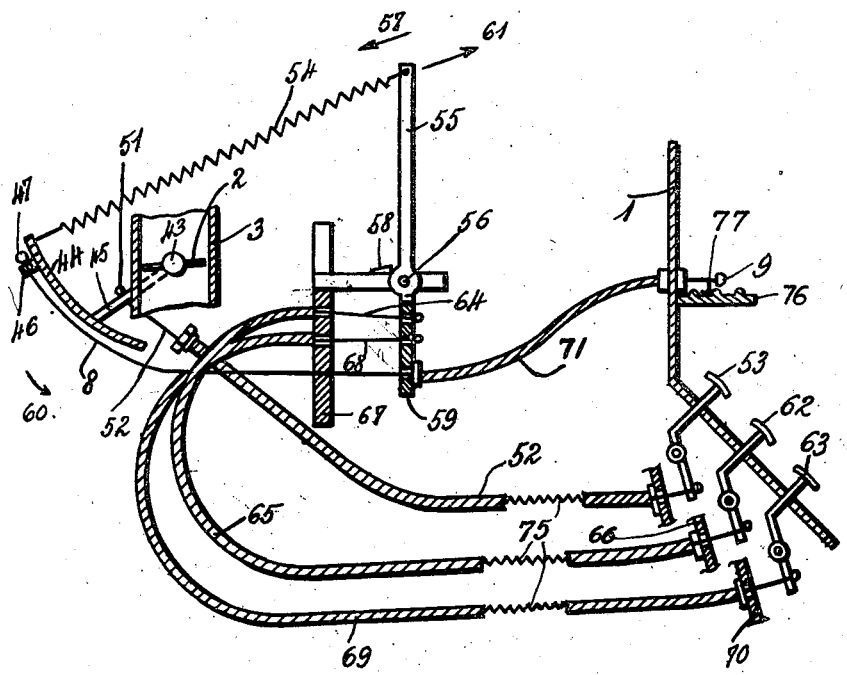
Fig. 4 is a vertical section of a modified embodiment of the device.

According to the embodiment shown in Figs. 1 to 3, 1 represents a control panel which might for example be the instrument panel of an automobile vehicle, and 2 the butterfly valve which controls the inlet through the pipe 3 of a carburettor not shown. The mechanical relay interposed between the panel 1 and the pipe 3 is composed of a main right angled slide block, the horizontal arm 4 of which is suitably guided in a slide-way formed by an end 5 and two side plates 6 and the vertical arm 7 of which is connected by a flexible control of the Bowden type 8 to the panel 1 which carries, for this purpose, a rod or knob 9 engaging rack 76 by means of spring 77 as shown in Fig. 4 which enables the inlet to be fixed at any desired point. On the other hand, the cable 10 enclosed in the sheath 8 which is adjustably secured to the arm 7 of the main slide block, passes through the arm 7 of said slide block and its end passes through the control 11 of the butterfly valve 2 controlling the gases and carries a head for pulling said control 11 against the action of the retracting spring 19.

It will be clearly seen that by pulling out the operating knob 9 of the control panel 1, a pull is exerted in the direction of the arrow F. Said pull has the effect of opening the throttle without modifying the position given the sheath 8. It is therefore possible to obtain the movement of the arrow F corresponding to the engine speed which is predetermined and said speed should remain constant so long as the control on the panel 1 is not modified.

However, it is sometimes desirable to be able to modify the speed chosen. For this purpose, the vertical arm 7 is adapted to move freely on the cable 10. This movement is obtained by means of a secondary slide 12 which is displaceable at right angles relatively to the main slide 4. The main slide 4 carries a finger or roller 13 and the secondary slide is provided with an oblique end forming a cam 14. A cable 15 which passes round a roller 16 is connected, on the one hand to the secondary slide 12 and on the other hand to a control lever or pedal 25 which is placed below the instrument panel 1 and which, in the case of an automobile vehicle, may be an independent pedal, the brake pedal or the clutch pedal suitably arranged for this purpose.

A spring 17 which bears on a part 18 bent at right angles of the end 5 and which reacts on the vertical arm 7 of the main slide constantly tends to push said slide in the opposite direction to the arrow $f$ (see Fig. 2).

It will be clearly seen that when, as previously explained, the speed it is desired to maintain constantly has been chosen, it is sometimes possible to modify same between the maximum chosen and zero. It suffices to exert a pull on the cable 15 in the direction of the arrow $F^1$ for the oblique end 14 of the secondary slide, bearing against the roller 13, to push said slide 4 in the direction of the arrow f, against the action of the spring 17. During this movement of the slide 4, the arm 7 of said slide moves along the cable 10 and pulls the sheath, thereby enabling the throttle retracting spring 19, which is attached to a fixed point 20 of the frame, to absorb the elongation of the cable and thereby enable the retracting spring 19 to return the throttle 2 towards the closed position. As soon as the pull on the cable 15 is released, a retracting spring 21 returns the secondary slide 12 to its inoperative position, which slide is suitably guided for this purpose in a slide-way 22 constructed in one or two parts, which is fixed on one of the side plates 6 and the inlet suitable for obtaining the selected speed is automatically reverted to.

The cam portion 14 of the slide 12 is provided with a very inclined face having a quick action, which has the effect of reducing the gases in the shortest possible time as soon as the pull is started on the cable 15 by depressing the pedal 25, and with a plane surface perpendicular to the direction of the movement of the slide 4, which enables the pull on the cable 15 to be continued and thereby to maintain the reduction or the total closing of the inlet of fuel to the engine.

Assuming that the cable 15 is controlled by the brake pedal, it is necessary for the gases to be shut off before braking begins, the action of the cam 14 has therefore to be immediate.

The second control, which may also be effected in a flexible manner by means of a flexible cable of the Bowden type 26, is obtained by means of a pedal 27 on the right angled arm 28 of which is attached the cable 29, the other end of which passes through the control 11 of the throttle 2 and carries a head 30 for pulling said control against the action of the retracting spring 19, the sheath 26 being held, preferably adjustably, between fixed parts 31 and 32 of the body.

It will be readily understood that when, after having determined the speed of the engine by means of the rack knob 9, by depressing the pedal the throttle 2 has been allowed to close as previously mentioned responsive to the retracting spring 19 (extreme position of the control 11 opposite that shown in Fig. 1), it is still possible, by exerting a pressure on the pedal 27, to move the control 11 between the position of complete closure of the throttle 2 and the full open position of said throttle 2, whatever be the position of the rack knob 9, the part of the cable 10 between the members 7 and 11 bending or the end of the cable 10 slipping through the control 11.

The results obtained with the device which has just been described may, in the case of an engine mounted on an automobile vehicle, be obtained still more advantageously by means of the device shown in Fig. 4.

In this example, the spindle 43 of the butterfly valve 2 is rigidly secured, outside the pipe 3, to a sector 44 to which it is connected by a lever 45 which extends approximately to the middle of said sector.

Near its end located above the lever 45, the sector 44 is provided with an eye 46 in which is engaged the end, terminating in a ball or head 47, of the flexible cable 8, the other end of which is secured to the knob 9 provided on the instrument panel 1 of the vehicle.

By means of this arrangement, it is possible by simply operating the knob 9 to adjust the position of the throttle 2 in the pipe 3. It is therefore thus possible to place, by hand, the throttle 2 in a position corresponding to a predetermined speed of operation of the engine.

In order to enable the aforesaid predetermined speed to be modified if necessary, the lever 45 is provided with a hole in which is engaged the end of a flexible cable 52 provided with a head 51, the other end of which extends to the usual accelerator pedal 53.

The device is completed by a spring 54 which connects the upper end of the quadrant 44 to one of the arms 55 of a lever which is pivoted on a fixed pin 56. Any movement of the lever in the direction of the arrow 57 responsive to the action of the spring 54 is prevented by a stop 58.

The shorter arm 59 of the aforesaid lever is connected to the brake pedal 62 and to the clutch pedal 63.

The connection between the arm 59 and the brake pedal 62 is effected by means of a flexible cable 64 lodged in a flexible sheath 65 extending between a fixed bearing surface 66 on one side and an angle bracket 67 on the other side. Similarly, the arm 59 is connected to the clutch pedal 63 by a flexible cable 68 lodged in a flexible sheath 69 extending between a bearing surface 70 and the angle bracket 67. As shown, the two cables 64 and 68 pass through the angle bracket 67, and the cable 8, which extends to the knob 9, may also pass through said angle bracket.

This latter cable 8 also passes through the lower arm 59 of the lever and is placed in a flexible sheath 71 between said arm and the instrument panel 1.

The engine operating after the position of the throttle valve 2 of the pipe 3 has been adjusted by means of spring 77 of knob 9 engaging rack 76, the devices operate as follows:

1. If no pedal is depressed, the engine operates at the speed which corresponds to the predetermined position of the throttle valve 2.

2. If the accelerator pedal 53 is depressed, the quadrant 44 is caused to move in the direction of the arrow 60 and consequently a greater inlet is produced. It should be noted that during this movement of the quadrant 44, the head 47 does not move so that when the accelerator pedal is released, the butterfly valve 2 returns to its initial position.

3. If the brake pedal 62 or the clutch pedal 63 is depressed or both pedals are depressed simultaneously, this action has the effect of rocking the lever to which the cables 64 and 68 are attached, in the direction of the arrow 61. In its movement, the lever carries with it the quadrant 44 by means of the spring 54, thereby causing the throttle to close. As soon as the aforesaid pedal or pedals are released, the spring 54 returns the quadrant 44 to the position which was predetermined by the knob 9.

In order to prevent, owing to any locking of the cables 52, 64 and 68, any one of the pedals 53, 62 and 63 from being locked and consequently unable to perform its normal function, a resilient member such as spring 75 of appropriate power, which operates as a safety member, may be provided at any point of cable 52, or 65, or 69.

I claim:

1. A device for the control of the fuel supply of an engine comprising a member carried by the throttle valve of said engine and outside the inlet pipe, a first cable connecting said member to a control knob, a second cable connecting said member to the accelerator pedal of the engine, a spring connecting the upper end of said member to the upper end of a rocking lever, a stop limiting the stroke of said rocking lever and two cables connecting the lower end of said rocking lever, respectively, to the clutch pedal and to the brake pedal.

2. A device according to claim 1—wherein the member carried by the throttle valve is provided with an eye in which is engaged the end of the cable connecting said member to the knob, said cable terminating in a ball.

3. A device according to claim 1—wherein a resilient member is provided in the several cables used in the device.

4. A device for the control of the fuel supply of an engine comprising a member carried by the throttle valve of said engine and arranged outside the inlet pipe, a first means connecting said member with a control knob, a second means connecting said member with the accelerator pedal of said engine, a rocking lever, a stop limiting the stroke of said rocking lever, two further means connecting the lower end of said rocking lever, respectively, with the clutch pedal and with the brake pedal, a spring connecting the upper end of said member with the upper end of said rocking lever to automatically return said throttle valve into the position selected by said control knob when at least one of the following pedals, said clutch pedal, and said brake pedal, has been previously depressed and thereafter released again.

ROBERT HAUGUEL.